Dec. 8, 1964  T. D. BAILEY  3,160,364
HAULING DEVICE FOR VEHICLES
Filed Aug. 2, 1962  2 Sheets-Sheet 1
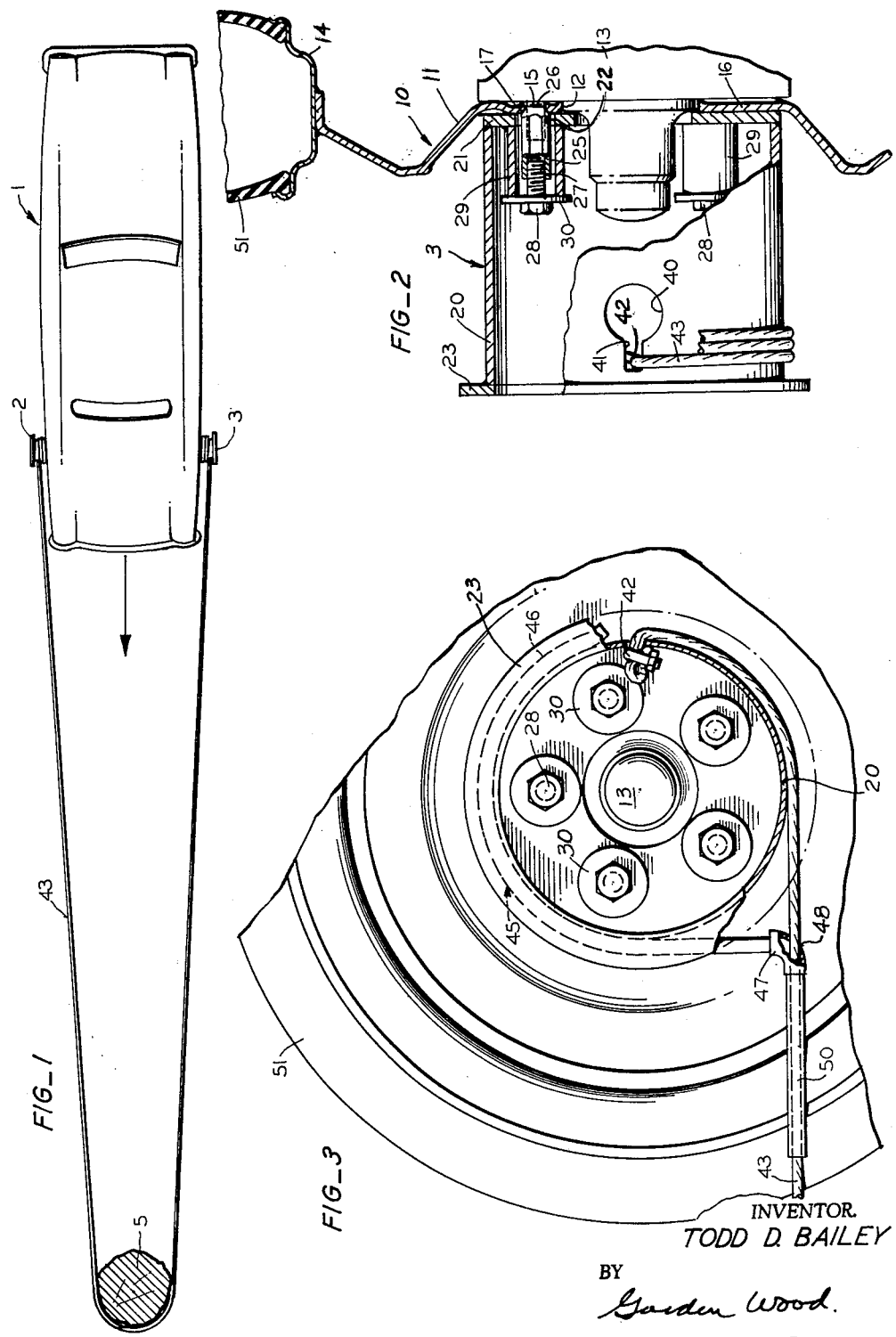
INVENTOR.
TODD D. BAILEY
BY
Gordon Wood.
ATTORNEY Dec. 8, 1964   T. D. BAILEY   3,160,364
HAULING DEVICE FOR VEHICLES
Filed Aug. 2, 1962   2 Sheets-Sheet 2
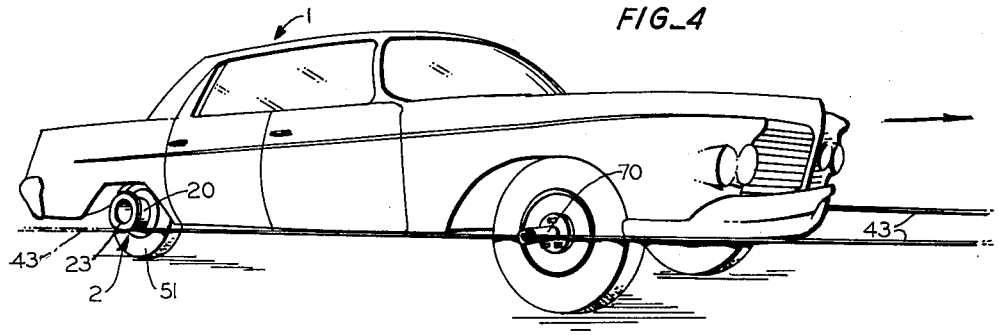
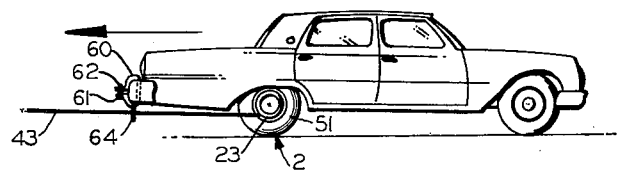
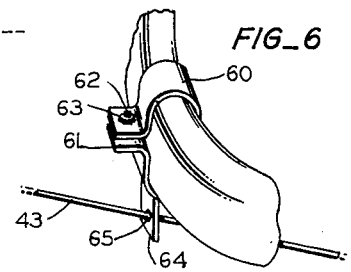
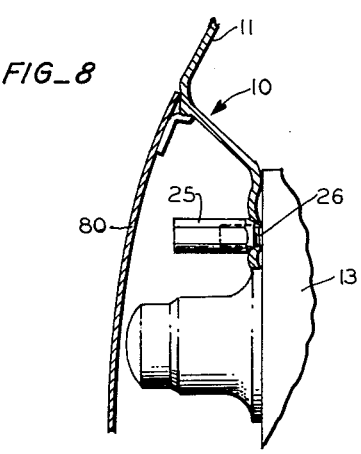
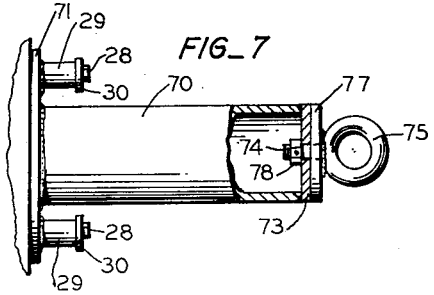
INVENTOR.
TODD D. BAILEY
BY
Gordon Wood
ATTORNEY

United States Patent Office 3,160,364
Patented Dec. 8, 1964

3,160,364
HAULING DEVICE FOR VEHICLES
Todd D. Bailey, 1260 Floral Ave., Oroville, Calif.
Filed Aug. 2, 1962, Ser. No. 214,341
6 Claims. (Cl. 242—95)

This invention relates to a hauling device for vehicles and more particularly to an apparatus that is adapted for use by conventional passenger automobiles although the same may be employed with trucks or any other power driven vehicles.

Automobiles quite often lose their traction when they are off the road. This frequently happens in mountainous areas where the roads are narrow and an automobile is required, for one reason or another, to move off the paved highway. It is also necessary in many instances to move the vehicle from an icy or muddy surface on which it has become mired. In these cases, and especially in remote areas, it is quite often impossible to obtain help and, if such help is available, the delay involved in obtaining it is usually quite prolonged.

It is, therefore, the main object of the present invention to provide an effective means for employing the power of the automobile or other vehicle to haul it out of a location in which it has lost traction.

Another object of the invention is the provision of an attachment for automobiles providing a hauling means which may be secured to the automobile in a matter of minutes so that the vehicle may be extricated from its difficulty without undue delay.

Another object of the invention is the provision of a hauling means which may be attached to the power wheels of a vehicle without removing the wheels of the latter.

Another object of the invention is the provision of a hauling attachment for vehicles which may be used under adverse conditions without endangering the exterior finish of the vehicle through abrasion of the hauling rope with the chassis or body of the vehicle.

Other objects and advantages will be seen from the following specification and from the drawings:

FIG. 1 is a top plan view of an automobile showing the manner in which it is connected by the invention to a fixed object such as a tree so as to move the automobile in a reverse direction.

FIG. 2 is a side elevation, partly in section, of one of the drums of the invention showing how it is attached to a rear wheel of the vehicle.

FIG. 3 is an end view of the drum partly broken away and in section and showing the guide means employed to prevent chafing of the hauling rope with the tire of the wheel.

FIG. 4 is a perspective of an automobile showing a guide attached to the forward wheel to permit the automobile to be pulled in a forward direction without marring the finish of the automobile.

FIG. 5 is a side elevation of an automobile showing a modified form of the invention in which guides are secured to the rear bumper to permit hauling the automobile in a reverse direction without marring any portion of the chassis or body.

FIG. 6 is a fragmentary perspective of the rear bumper showing one method of securing a rear bumper guide.

FIG. 7 is a side elevation partly in section of the front wheel guide.

FIG. 8 is a vertical fragmentary section of an automobile wheel showing the securing nut in its normal installed position and showing the decorative hubcap in place.

In detail and first with reference to FIG. 1 a conventional automobile is indicated at 1 and is provided on its rear power wheels with drums 2, 3. A wire rope 43 is connected at its opposite ends to drums 2, 3 respectively and is secured intermediate its ends to a fixed support such as a tree 5. It will be understood that any fixed object may be employed for hauling the automobile and if one is not available a heavy spike may be driven into the ground for this purpose.

Drums 2, 3 are identical and drum 3 is indicated in detail in FIG. 2, wherein it is shown secured to a steel wheel 10 which may take several shapes depending on the type of automobile involved, but which ordinarily includes a pressed annular wheel disk 11 provided with a central opening 12 adapted to be received on the axle structure 13 of the automobile. The outer periphery of the wheel disk 11 is fixedly secured as by welding to the tire receiving rim 14.

Regardless of the particular configuration of the wheel disk 11 it usually includes a plurality of holes 15 for receiving studs or bolts therethrough for securing the wheel disk 11 to the axle of the vehicle. In most instances an odd number of holes 15, such as five, are provided and between the holes 15 the wheel disk 11 may be flat as indicated at 16 in FIG. 2.

It is customary to form wheel disk 11 to provide frustoconical socket portions 17 which are formed complementary to similarly shaped nuts which may be tightened on the studs extending outwardly from the axle structure so as to center the wheel on the axle as well as providing a strong holding force. In some cases the fastening element for the wheel is a bolt the head of which is formed with the frustoconical surface for engaging the complementarily formed portion of the wheel disk. In most instances, however, a stud projects outwardly from the axle structure 13 and a nut is threadedly secured to the stud to press the wheel against the axle structure. By the present invention it will be seen that the particular type of fastener is not important but the more common stud and nut form will be described herein.

The drum 3 comprises a cylindrical sidewall 20 provided at its inner end with an end plate 21 which in turn is formed with a plurality of openings 22 that are sufficiently large to receive the wheel receiving nuts or bolts therethrough. This is for the purpose of permitting the installation of the drum without moving the wheel fastening elements. The outer end of the cylindrical sidewall 20 is provided with a relatively heavy annular rim 23 which not only stiffens the drum but provides a stop to prevent the windings of the rope from falling off the drum.

By the present invention the wheel fastening nuts or bolts are discarded and are replaced by nuts such as indicated at 25 in FIG. 2. Nut 25 is considerably longer in axial extent than the nut or bolt head which is provided with the wheel for a purpose that will be seen later on. Said nut 25 is formed at its inner end with the same frustoconical shape provided on the original nut and is threadedly secured to the existing stud 26 which projects outwardly from the axle structure 13. The outer end of the elongated nut 25 is also internally threaded as indicated at 27 to receive therein a conventional bolt 28. Interposed between the bolt 28 and the endplate 21 of the drum is a cylindrical spacer 29 which may take the form of a short length of pipe. Said spacer may be secured as by welding to the inner side of endwall 21. To provide a bearing surface for the head of bolt 28 a washer 30 may be interposed between the bolt head and the cylindrical spacer 29 and said washer may be welded to the bolt head as shown in FIG. 2.

At this point it may be noted that to install the drum 3 it is merely necessary to apply the endwall 21 of the same against the wheel disk 11 so that the elongated nuts 25 on the studs 26 are received within the cylindrical spacers 29 and then insert the bolts 28 through washers 30 and into the threaded openings 27 of said nuts. Although in the case of a wheel having five fastening elements there may be provided five bolts 28, in many instances it may be sufficient to provide only three such bolts.

The cylindrical sidewall 20 of the drum 2 is formed with a keyhole slot 40 the narrow end 41 of which may be provided adjacent the outer end flange 23 as shown in FIG. 2. The wire rope employed with the invention is preferably ¼" diameter and may be looped over at one end and the loop secured with a conventional rope clamp 42 indicated in FIG. 3. In order to attach the rope 43 it is merely necessary to pass the end of the rope with the clamp through the large end of the keyhole slot 40 and slide said clamped end into the narrow portion 41 of the keyhole slot as shown in FIG. 2. At this point it will be noted that the rope 43 will always be fed onto the drum from the lower side thereof if the vehicle is moving toward the fixed end of the rope. This is desirable since it eliminates interference between the rope and the body or chassis of the automobile in most instances, the lower side of the drum being sufficiently low to avoid such interference.

To obviate chafing of the rope on the tire portion of the wheel a guide generally designated 45 (FIG. 3) is provided. Said guide includes a looped portion 46 which may be formed of pipe and which is provided at one end with a conventional pipe elbow 47. An opening 48 is formed in the curved rear wall of pipe elbow 47 to receive the rope therethrough and a guide pipe 50 is secured to elbow 47 as seen in FIG. 3 so that when the rope is passed therethrough the pipe 50 protects the tire 51 from chafing by the rope 43. It will be understood that the looped portion 46 of hanger 45 is unaffected by the rotation of the drum or the windings of the rope that are formed thereon and always remains in the position shown.

In most instances it is possible to haul the automobile 1 shown in FIG. 1 towards the tree 5 by the above described structure alone, but if there is any likelihood of the rope 43 engaging the exterior surface of the automobile guides may be provided on the rear bumper as indicated in FIG. 6. Such a guide may take the form of a pair of vertically spaced jaws 60, 61 secured together by bolt 62 and nut 63. The lower jaw 61 may be provided with the depending lug 64 which is apertured as at 65 to receive rope 43 therethrough thus holding said rope away from any portion of the automobile with which it would otherwise interfere.

In FIG. 4 the invention is shown employed with an automobile for hauling the latter in a forward direction. In such a case it is usually necessary to provide a forward guide for the rope and this preferably takes the form of a short spacer pipe 70 which is detailed in FIG. 7. Pipe 70 is provided at one end with a flange 71 which may be provided with a pair of spacers 29 in much the same manner as shown in FIG. 2. In this case it is unnecessary to provide any more than two bolts 28 for securing the spacer to the front wheels of the automobile. The outer end of the pipe spacer 70 is provided with a transverse plate 73 which is centrally apertured to receive shank 74 of a fairlead ring 75 welded to a swivel plate 77 which is free to rotate relative to the fixed endwall 73. A nut 78 secures the swivel plate 77 and its fairlead ring 75 for rotation relative to the pipe spacer 70.

It will be seen that the above described structure is not only readily applied to the automobile but all that is required to operate the same is to start the automobile in the normal manner and rotate the power driven wheels in the same direction as they would rotate if their traction were relied on to move the vehicle.

An important feature of the invention is the provision of the elongated nuts 25 which, although longer than the nuts normally provided for the wheels are not of sufficient length to interfere with the usual decorative coverplate 80 which is applied to the wheel disk 11 as seen in FIG. 8. It will be understood, of course, that the particular size of the drums 2, 3 and the spacing of the holes 22 which receive the fastening elements will depend on the particular automobile for which the apparatus is designed. Since many different automobiles have the same pitch circle and bolt size on the wheels it is not necessary to provide a great many different sizes to take care of most vehicles.

As stated above, if the vehicle wheel is provided with bolts instead of studs it is merely necessary to substitute bolts with elongated heads similar to elongated nuts 25 in lieu of the original bolts which secure the wheel in place.

The above specific description of the preferred form of the invention should not be taken as restrictive thereof as it will be apparent that various modifications in design will occur to those skilled in the art without departing from the scope of the invention as defined in the following claims.

I claim:
1. A power transmission drum adapted to be secured to the wheel of a vehicle which is provided with a circular row of holes and fastening elements received therethrough, said drum comprising:
   a generally cylindrical rope receiving peripheral wall,
   a generally transversely extending end member fixed to one end of said wall having an outer side adapted to abut said wheel,
   said end member being formed with a plurality of spaced openings in registration with said fastening elements for receiving said elements therethrough when said outer side is in abutment with said wheel,
   spacing means adjacent one of said openings and fixed to said end member and providing a surface spaced from said outer side and directed axially of said drum adapted to be engaged by a drum securing device,
   said drum securing device being adapted to be connected to the outer end of the fastening element in said one opening.
2. A drum according to claim 1 wherein said drum securing device comprises a cross piece adapted to engage said axially directed surface and a bolt passed through said cross piece and threadedly secured to the fastening element in said one opening.
3. In combination with a vehicle wheel provided with a circular row of holes for receiving fastening elements therethrough,
   a plurality of fastening elements extending outwardly from said holes and securing said wheel to said vehicle,
   a power transmission drum mounted on said wheel and including a generally cylindrical rope receiving peripheral wall,
   a generally transversely extending end member fixed to one end of said wall and having an outer side in abutment with the outer side of said wheel,
   said end member being provided with a plurality of openings in registration with said fastening elements and receiving said elements therethrough,
   spacing means fixed to said end member and extending axially inwardly of said drum and including an inner axially directed surface spaced inwardly of the free end of said fastening elements,
   a drum securing device cooperating with said surface and said free end for securing said drum to said one fastening element and to said wheel.
4. A combination according to claim 3 wherein said drum securing device comprises a bearing element in engagement with said surface and a bolt passed through said bearing element and threadedly engaging the free end of said one fastening element.
5. An attachment adapted to be secured to a power driven wheel that normally includes a plurality of nuts tightened on studs for securing said wheel to said vehicle, comprising:
   a drum adapted to be secured coaxially to said wheel and provided with an inner transversely extending member in abutment with said wheel, a plurality of elongated nuts secured at their inner ends to threaded means carried by the vehicle for so securing the wheel to said vehicle, said inner member of said drum being provided with spaced openings receiving said nuts therethrough to permit abutment of said inner end with said wheel, fastening elements carried by said drum and screw threadedly received in the outer ends of said nuts for securing said drum to said wheel, spacing means carried by said member and interposed between said fastening elements and said inner member.

6. A device according to claim 5 wherein said spacing means are hollow cylindrical members receiving the outer ends of said nuts therein, and said fastening elements are bolts extending between the outer ends of said cylindrical members and said nuts.

References Cited by the Examiner

UNITED STATES PATENTS

| | | | |
|---|---|---|---|
| 1,054,831 | 3/13 | De Peel | 242—95 X |
| 1,096,606 | 5/14 | Delano | 180—7 |
| 2,127,858 | 8/38 | Coleman | 242—95 |
| 2,240,570 | 5/41 | Oesterheld | 242—95 X |
| 2,642,235 | 6/53 | Smith | 242—95 |
| 3,099,416 | 7/63 | Wright | 242—95 |

FOREIGN PATENTS 557,760   2/57   Italy.

MERVIN STEIN, *Primary Examiner.*

LEO FRIAGLIA, *Examiner.*